United States Patent

Brambilla

[11] Patent Number: 5,364,316
[45] Date of Patent: Nov. 15, 1994

[54] POWER DISTRIBUTOR UNIT PARTICULARLY FOR AGRICULTURAL, INDUSTRIAL AND SIMILAR MACHINE

[75] Inventor: Alberto Brambilla, Rodengo Saiano, Italy

[73] Assignee: Clark-Hurth Components S.p.A., Arco, Italy

[21] Appl. No.: 18,598

[22] Filed: Feb. 17, 1993

[30] Foreign Application Priority Data

Mar. 2, 1992 [IT] Italy .............................. MI92A000462

[51] Int. Cl.⁵ ............................................ F16H 47/04
[52] U.S. Cl. .................................... 475/80; 475/211
[58] Field of Search ......................... 475/80, 73, 72

[56] References Cited

U.S. PATENT DOCUMENTS

| | | | |
|---|---|---|---|
| 3,203,277 | 8/1965 | General | 475/211 |
| 3,375,733 | 4/1968 | Browning | 475/211 |
| 3,709,061 | 1/1973 | Orshansky, Jr. | 475/80 |
| 3,722,324 | 3/1973 | Cordner et al. | 475/80 |
| 3,866,490 | 2/1975 | Orshansky, Jr. | 475/80 |
| 3,988,949 | 11/1976 | Weseloh et al. | 475/80 |
| 4,750,381 | 6/1988 | Kita et al. | 475/80 |
| 5,024,633 | 6/1991 | Schmidt | 475/80 |

FOREIGN PATENT DOCUMENTS

| | | |
|---|---|---|
| 0308078 | 3/1989 | European Pat. Off. . |
| 2274837 | 1/1976 | France . |
| 3408543 | 9/1984 | Germany . |
| 227479 | 7/1942 | Switzerland . |
| 340685 | 8/1955 | Switzerland . |

OTHER PUBLICATIONS

Maschinen Bautechnik vol. 19, No. 8, 1970, pp. 417–422 Heinke "Stufenlos Verstellbare Ketten–Getriebe Mit Leistungsverzweigung" *p. 418; Figure AA*
Patent Abstracts of Japan vol. 013, No. 458 (M-880)17 Oct. 1989 & JP-A-11 78 038 (Shimadzu) * The whole document*.

*Primary Examiner*—Dirk Wright
*Attorney, Agent, or Firm*—Guido Modiano; Albert Josif; Daniel O'Byrne

[57] ABSTRACT

The power distributor unit has an input drive shaft rigidly connected to a spider for a train of planetary gears of an epicyclic train. The epicyclic train has a sun gear keyed to a transmission shaft. A locking device is keyed to the shaft for locking the sun gear with respect to a ring gear of the epicyclic train. A transmission mechanism is also keyed to the shaft for connecting the sun gear to a continuously-variable transmission. A first clutch connects the ring gear to a first countershaft, which is connected to the continuously-variable transmission, and is rigidly connected to an output gear of the power distributor unit.

9 Claims, 3 Drawing Sheets

POWER DISTRIBUTOR UNIT PARTICULARLY FOR AGRICULTURAL, INDUSTRIAL AND SIMILAR MACHINE

BACKGROUND OF THE INVENTION

The present invention relates to a power distributor unit particularly for agricultural, industrial and similar machines.

As is known, agricultural and industrial machines use gearboxes which try to approximate the theoretical stepless gearbox with the possibility of presetting the gear ratio and with high efficiencies.

Gearboxes currently use transmissions provided with torque converters and with a large number of power-shiftable speeds, technically known as torque converter power-shift transmissions. Occasionally transmissions are used without a torque converter, in agricultural machinery wherein efficiency is essential, or in machines for industrial use with hydrostatic motors and pumps, and having a small nunsher of power-shiftable gears arranged downstream of the hydrostatic motors.

Attempts have been made to obviate the limits of such known structures with power distributor units. Studies conducted by Kutzbach in 1929 were applied in 1938 by Fottinger with a hydraulic coupling from which, in the course of time, gearboxes known as Hydromatik, Dodge, Diwabus, Ilomatik, SRM and others available in the literature have been developed.

The use of torque converters or couplings entails disadvantages regarding their use: it is in fact not possible to control the gear ratio and to achieve high efficiency.

One solution to the above described problems was disclosed in Italian patent application no. MI91A000538 dated Mar. 1, 1991, which described a continuously-variable transmission of the type which distributes accumulated power, and which used a metallic chain acting between conical pulleys. However, it should be noted that in said patent application there is still only one power distribution step and that in order to increase the range of the continuously-variable transmission, hereinafter termed CVT, it is necessary to insert, downstream of said CVT, a two-speed unit which has a high ratio and requires power-shifting but has great difficulties in the adjustment of the metallic chain simultaneously with the clutches arranged thereat.

In order to clarify the typical requirements of a gearbox for agricultural use, it should be mentioned, by way of example, that a tractor works in two or more separate steps: as power source on the field, at speeds comprised between 2.5 and 9.5 kilometers per hour, and during transport on roads, with speeds which correspond to the maximum-power condition, equal to 10-38 kilometers per hour. The conversion ratio required in the two situations is equal to approximately 3.8 and can be used in the various steps by means of a set of gears arranged downstream and equipped with a reverse gear, possibly built into the rear axle.

SUMMARY OF THE INVENTION

The aim of the present invention is to eliminate or substantially reduce the problems described above by providing a power distributor unit particularly for agricultural, industrial and similar machines having a presettable total ratio and a high degree of efficiency.

Within the scope of the above aim, an object of the present invention is to provide a power distributor unit which is capable of providing a conversion ratio equal to 3.8:1.

Another object of the present invention is to provide a power distributor unit which is highly reliable, relatively easy to manufacture and competitive in cost.

This aim, the objects mentioned and others which will become apparent hereinafter are achieved by a power distributor unit particularly for agricultural, industrial and similar machines, according to the invention, comprising an input drive shaft, characterized in that said drive shaft is connected to a spider for planetary gears of an epicyclic train including a sun gear and a ring gear, said sun gear being keyed to a transmission shaft, locking means being keyed to said transmission shaft for locking said sun gear with respect to said ring gear of said epicyclic train, transmission means being keyed to said transmission shaft and connecting said sun gear to a continuously-variable transmission, a first clutch for connecting said ring gear to a first countershaft, said first countershaft being connected to said continuously-variable transmission, said ring gear being rigidly connected to an output gear of said power distributor unit.

BRIEF DESCRIPTION OF THE DRAWINGS

Further characteristics and advantages of the invention will become apparent from the description of a preferred but not exclusive embodiment of a power distributor unit particularly for agricultural, industrial and similar machines according to the invention, illustrated only by way of non-limitative example in the accompanying drawings, wherein.

DESCRIPTION OF THE PREFERRED EMBODIMENTS

Figure 1:
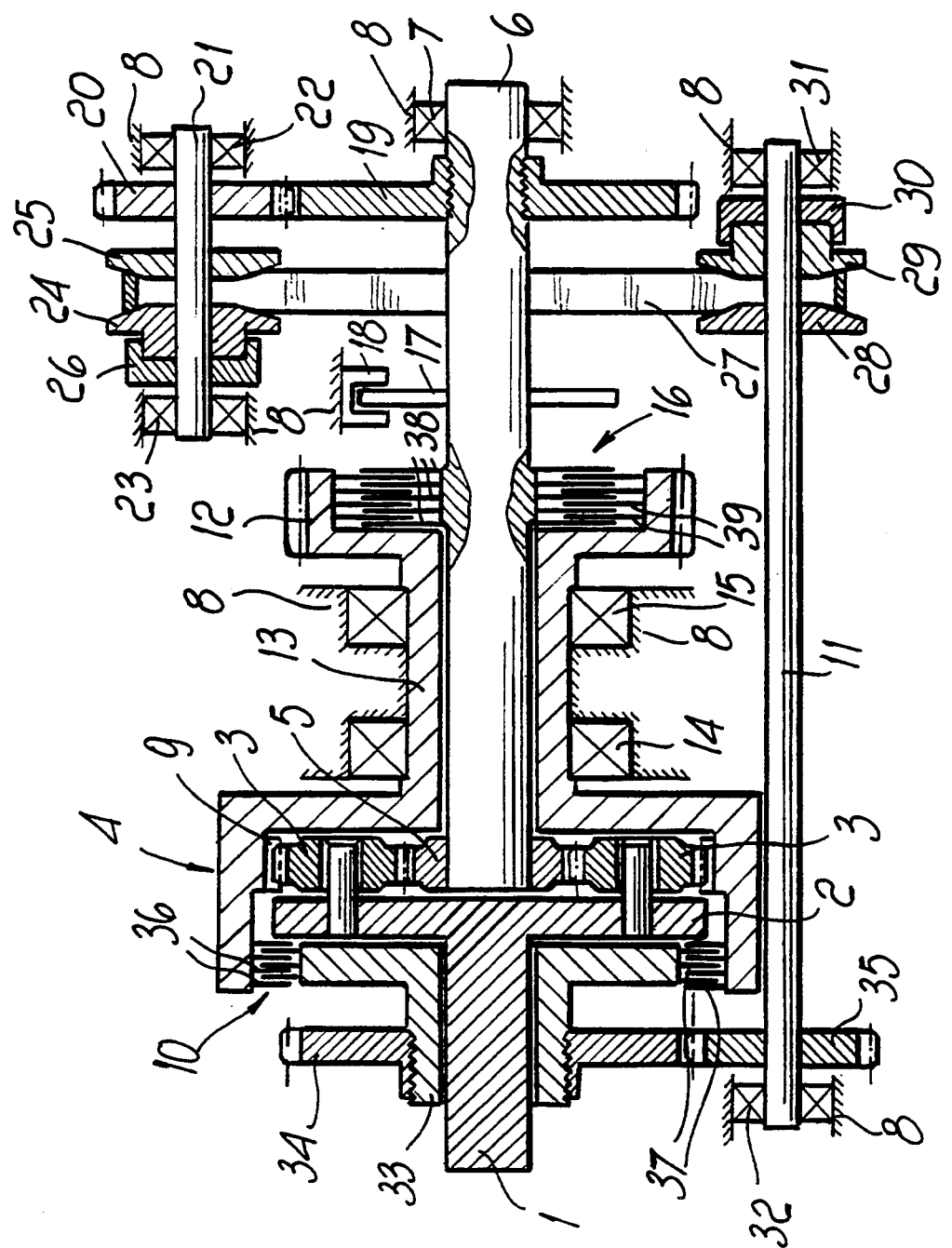
FIG. 1 is a mechanical diagram of a first embodiment of a unit according to the invention.

With reference to the above figures, a power distributor unit particularly for agricultural, industrial and similar machines comprises an input drive shaft 1 which supports a spider 2 for planetary gears 3 of an epicyclic train 4.

The sun gear 5 of the epicyclic train 4 is keyed on a transmission shaft 6 which is rotationally coupled, by means of a bearing 7, to a frame 8 for supporting the unit according to the invention. Locking means, which lock the sun gear 5 with respect to a ring gear 9 of the epicyclic train 4, and transmission means, which connect the sun gear 5 to a continuously-variable transmission, are keyed to the transmission shaft 6.

The ring gear 9 can be connected, by means of a first clutch 10 or lock-up clutch, to a first countershaft 11 which is connected to the continuously-variable transmission, as explained in detail hereinafter, and is rigidly connected to an output gear 12 of the power distributor unit according to the invention.

The ring gear 9, which meshes with the planetary gears 3, is arranged on an internal surface of a first hollow shaft 13 supported, by means of ball bearings 14 and 15, by the frame 8.

The first hollow shaft 13 is provided with the output gear 12 on an external surface and is selectively connectable to the transmission shaft 6 by means of a second clutch 16 or lock-up clutch.

The locking means comprise a brake having a disk 17 keyed on the transmission shaft 6 and a brake caliper 18 fixed to the frame 8.

The continuously-variable transmission comprises a first gear 19 keyed on the transmission shaft 6 and meshing with a second gear 20 keyed on a second countershaft 21, supported by bearings 22 and 23 connected to the frame 8.

The second countershaft 21 is provided with a first pair of pulleys 24 and 25 selectively engaged by a first clutch 26 and in which a trapezoidal metallic belt 27 engages; said belt engages a second pair of pulleys 28 and 29 arranged on the first countershaft 11 and coupled to the first countershaft 11 by a second clutch 30.

The first countershaft 11 is rotatably supported by bearings 31 and 32 connected to the frame 8.

The first hollow shaft 13 is selectively connected to a second hollow shaft 33 by means of the first clutch 10. The second hollow shaft 33 is provided with a third gear 34 keyed thereon and meshes with a fourth gear 35 keyed on the first countershaft 11.

The first clutch 10 is provided with driving disks 36 which are rigidly coupled to the first hollow shaft 13 and with driven disks 37 rigidly coupled to the second hollow shaft 33. The second clutch 16 is provided with driving disks 38 keyed on the transmission shaft 6 and with driven disks 39 rigidly coupled to the first hollow shaft 13. The first clutch 10 and the second clutch 16 can each be selected in an independent manner.

For example, let us consider the case of a distribution epicyclic train 4 provided with a gear ratio comprised between 1.15 and 1.5 when one of its elements is locked. The train 4 can be used both for reduction and for overdrive.

Let us select a train 4 which has an overdrive of 0.781, which can be considered acceptable for the performance of an agricultural tractor. This overdrive is used to raise the maximum speed of a tractor from 30 kilometers per hour, which can be approved worldwide, to approximately 38 kilometers per hour, which can be approved only in Europe.

As previously mentioned, the minimum speed which can be set with the engine running at its nominal rate without acting on the downstream gear unit must be approximately 10 kilometers per hour, which allows the tractor to start moving while towing a trailer even uphill during road transport. Let us assume, by way of example, a heavy agricultural tractor with an installed power of 135 kilowatts. Its engine usually has a maximum rotation rate of approximately 2200 rpm and a maximum net torque at the flywheel of approximately 700 newton per meter.

With the selected gear ratio, which can be obtained with an epicyclic train 4 provided with a ring gear 9 having 82 teeth, with planetary gears 3 having 29 teeth rotatably coupled to a spider 2 connected to the drive shaft 1, and a sun gear 5 having 23 teeth. When the sun gear 5 is locked by the brake 17 rigidly coupled to the frame 8 by the caliper 18, the overdrive ratio is produced and can be drawn from the output gear 12.

In this high-speed step, i.e. between 30 and 38 kilometers per hour, the ratio is fixed and adjustment is performed by the speed of the engine, which is comprised between 1718 and 2200 rpm, and the trapezoidal metallic belt 27 is motionless, since the clutch 26 is disengaged.

By releasing the caliper 18, and thus the brake 17, and by engaging the second clutch 16, the components of the train 4 are locked, thus obtaining a second step which has speeds comprised between 24 and 30 kilometers per hour, wherein the ratio is fixed, adjustment is performed by the rate of the engine, which is comprised between 1800 and 2200 rpm, and the trapezoidal metallic belt 27 rotates with no load, with the clutch 30 disengaged.

The power branching step is obtained by releasing the second clutch 16 and engaging the first clutch 10, in addition to the clutches 26 and 30; in this step, approximately 21.9% of the input power is delivered to the sun gear 5 and approximately 78.1% of the input power is delivered to the ring gear 9.

A continuously-variable transmission having the following limits of applicability was used to determine the performance:

| | |
|---|---|
| maximum input torque | 220 Newtons per meter |
| maximum rpm rate | 6000 rpm |
| adjustment from 0.45 in overdrive to 2.25 in reduction. | |

Considering the efficiencies, it is necessary to interpose the pair of gears 19 and 20, respectively having 43 and 28 teeth, between the sun gear 5 and the first pair of pulleys 24 and 25 and the pair of gears 34 and 35, respectively having 52 and 18 teeth, between the pair of pulleys 28 and 29 and the first clutch 10. Thus, bearing in mind Willis's formula for epicyclic trains, which is given by:

$$tau_0 = (n_2 - n_3)/(n_1 - n_3)$$

and having chosen a $tau_0 = -3.565$ with the belt 27 under maximum overdrive, one obtains:

$$n_1 = (28/43) * (1/0.45) * (18/52)$$
$$n_1 = 0.5\, n_2$$
$$n_3 = 2200 \text{ rpm}$$
$$tau_0 = (n_2 - 2200)/(0.5 * n_2 - 2200)$$
$$n_2 = 7404 \text{ rpm}$$
$$n_1 = 741 \text{ rpm}$$

and indeed, 220 rpm correspond to 30 kilometers per hour and 741 rpm correspond to 10 kilometers per hour. The efficiency of the belt 27 is usually equal to 92%, and the efficiency of the gear pairs is equal to 97%, so it is possible to calculate the output power values at the various rates. One obtains an output power of 127 kilowatts at 2817 rpm and of 117 kilowatts at 741 rpm, with an overall efficiency comprised between 87% and 94%, much higher than that of conventional systems.

Figure 2:
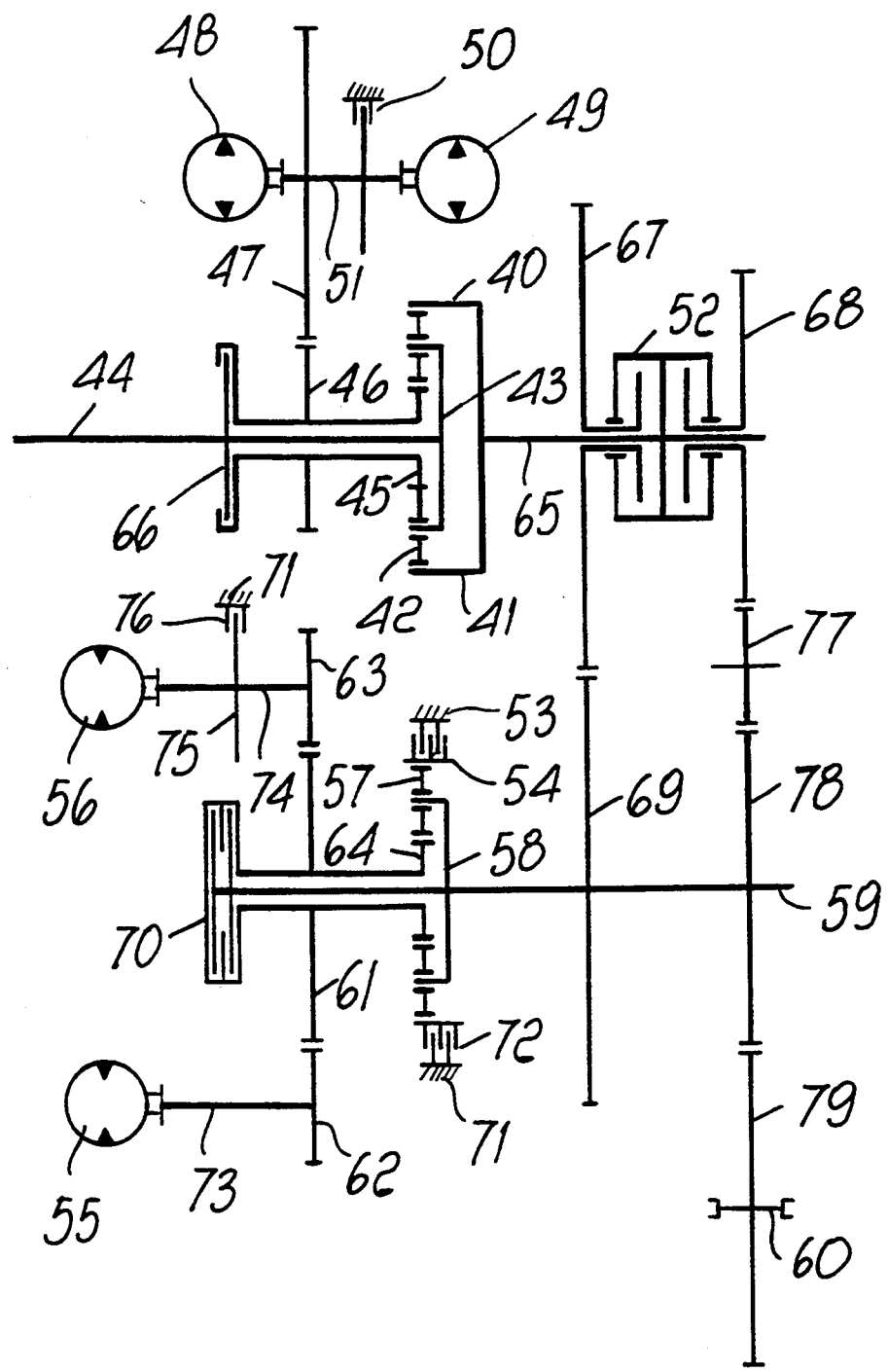
FIG. 2 a mechanical diagram of a second embodiment of the unit according to the invention.
Figure 3:
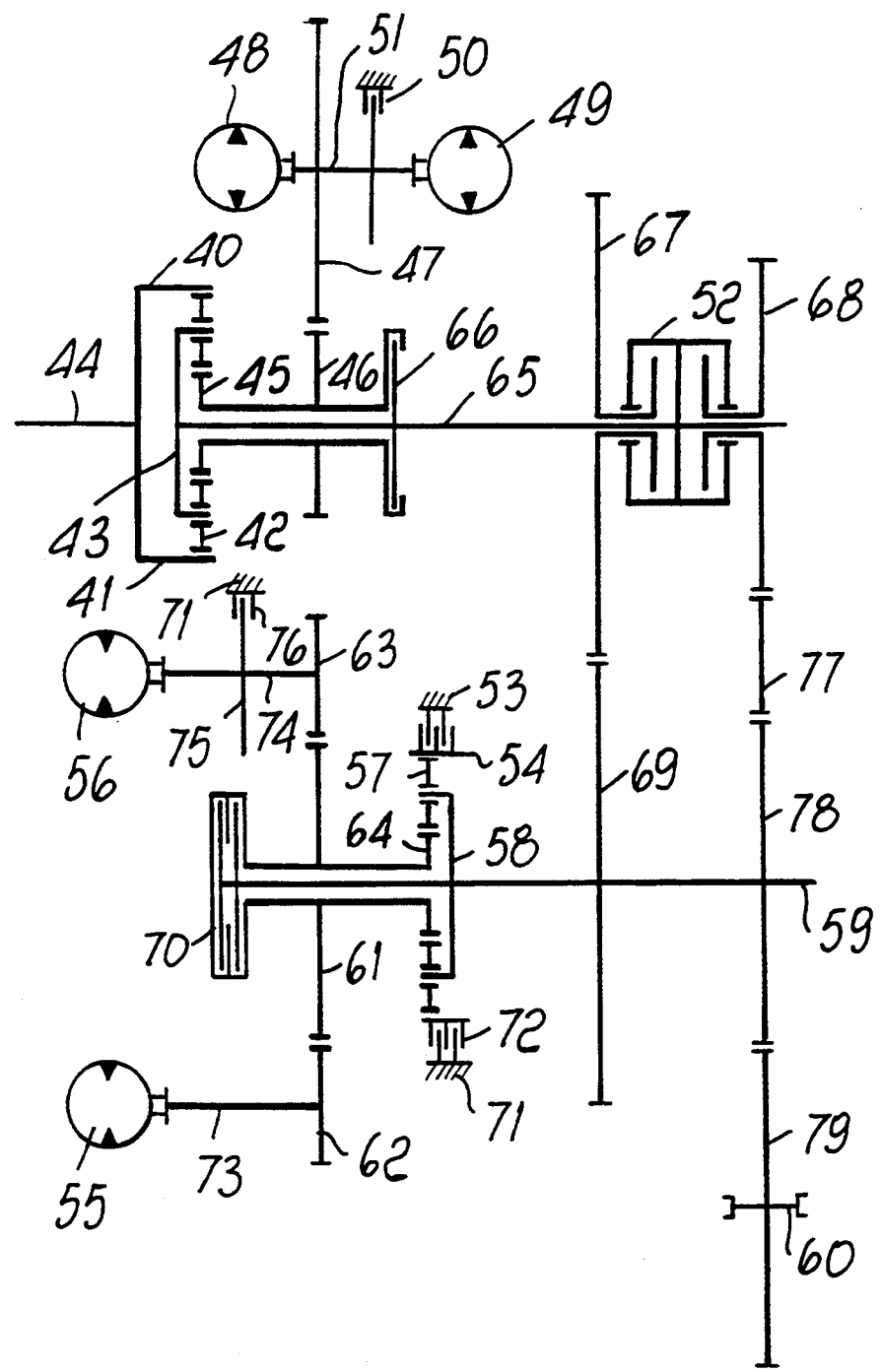
FIG. 3 is a mechanical diagram of a third embodiment of the unit according to the invention.

As shown in the accompanying FIGS. 2 and 3, another solution to the problem may be the use of hydrostatic components, such as pumps and motors, which allow to achieve a required conversion range, for example equal to 20, with excellent control over the gear ratio but with an efficiency which oscillates between 60% and 80%. Due to the different applicable statutory provisions, a typical earth-mover, such as a power loader, would have to be able to reach three different maximum speeds for road transport: 20 kilometers per hour in Germany, 30 kilometers per hour in Austria and 40 kilometers per hour in Italy; but in order to standardize the product, it is not possible to envisage changing ratios in the gearbox or in the axles or changing the calibration of the engine.

On the other hand, work tests show that the maximum speed of this vehicle is equal to approximately 18 kilometers per hour, which leads to conclude that the ideal solution would be a step for distributing the power between a mechanical branch and a hydrostatic branch from 2 kilometers per hour to 18 kilometers per hour and two purely mechanical steps from 20 kilometers per hour to 30 kilometers per hour and from 30 to 40 kilometers per hour.

A further form of application of the present invention can be constituted by a unit, as schematically described above, which has an epicyclic train 4 provided with a gear ratio comprised between 1.15 and 1.5 when one of the elements is locked. The train can obviously be used both in reduction and in overdrive.

By way of example, let us analyze a train 40 which provides an overdrive of 0.707, which is considered to be acceptable for a power loader. If this ratio is not sufficient, nothing disallows the insertion in input of a reduction device technically known as a HI-LO reducer providing a reduction of 1.9:1, thus halving speed shifts. The 0.707 overdrive is used to raise the speed of the loader from 27 kilometers per hour to 38 kilometers per hour, thus complying with said legal speeds with the motor running at rates comprised between 1555 and 2200 rpm.

In the direct-drive step, the vehicle has a speed of 19-27 kilometers per hour with the motor in the same rpm rate range, whereas between 2 and 19 kilometers per hour the motor runs, for example, always in the maximum-power condition, at 2200 rpm.

At 2 kilometers per hour, the loader provides a force equal to approximately 0.9 times its weight, which is more than adequate to perform its task. The following data have been chosen by way of example:

| application | loader |
|---|---|
| total empty weight | 21 tons |
| total gross weight | 33 tons |
| installed power | 178.5 kw at 2200 rpm |
| wheel index radius | 0.8 meters |

For this application, the epicyclic train 40 can be constituted by a ring gear 41 with 70 teeth connected to the mechanical branch, by a series of planetary gears 42 with 19 teeth which are mutually connected by a spider 43 connected to the drive shaft 44, and by a sun gear 45 with 29 teeth which is associated, by means of a kinematic gear train constituted by the gears 46 and 47, with the hydrostatic pumps 48 and 49 of the hydrostatic branch.

When a brake 50 locks the kinematic train connected to the sun gear 45, the outer ring gear 41 starts to overdrive, whereas the hydrostatic pumps 48 and 49 are motionless, with a travel speed comprised between 27 and 38 kilometers per hour. When the clutch 51 locks the epicyclic train 40, all the elements rotate at the same speed, and the hydrostatic pumps 48 and 49 also rotate idle, with a travel speed comprised between 19 and 27 kilometers per hour. When the elements of the train 40 are not retained, the power is distributed between the mechanical branch and the hydrostatic branch, with a travel speed comprised between 2 and 19 kilometers per hour.

A first problem is related to the reverse gear, since while the hydrostatic branch can reverse its motion, the mechanical branch requires a double clutch 52 (forward-reverse) to reverse its motion, otherwise the rpm rate of the sun gear 45 would increase enormously and in any case the same speed would never be reached in reverse. Another problem is the choice of a hydrostatic system capable of obtaining the conversion ratio required in the power distribution step as well as being disconnectable during the two following steps.

The conversion ratio is not due only to the variation which the motors must perform between 2 and 19 kilometers per hour, i.e. 9.5 times, but also to the corresponding variation of the rpm rate of the pump connected to the sun gear 45, i.e. 7000/3576 rpm = 1.9, for a total of approximately 18 times, which cannot be obtained by a simple system constituted by a pump and a hydrostatic motor.

In order to use hydrostatic components which are as standardized and compact as possible, a second epicyclic train 53 is used, with the double purpose of having a two-speed gearbox by locking the lower ring gear 54 or two corresponding elements, and of being able to lock the hydraulic motors 55 and 56, leaving said ring gear 54 free during the subsequent steps, i.e. for speeds comprised between 19 and 27 kilometers per hour and between 27 and 38 kilometers per hour.

In order to minimize possible shocks during speed shifting, provisions have been made so that starting from clearly defined conditions, i.e. hydraulic motors at minimum displacement and low gear engaged, one reaches other well-defined conditions, i.e. hydraulic motors at maximum displacement and high gear engaged, for an equal output speed, with the minimum possible torque difference and independently of the setting of the pump.

In order to provide what has been described, the total adjustment range, equal to 18, has been divided by the pump so adjustment, i.e. by 1.3, and the extraction of the square root of this result obtains both the required adjustment of the hydrostatic motors and the range of the gearbox, equal to 3.72.

Therefore, the second epicyclic train 53 might have a ring gear 54 with 60 teeth and planetary gears 57 with 19 teeth which are mutually connected and supported so as to be able to rotate by a spider 58 which is rigidly connected to a shaft 59 associated, by means of a kinematic train, both with the output shaft 60 and with the clutches 52 of the mechanical branch.

The adjustment of the motors is equal to 18/(1.3*3.72)=3.712, which cannot be obtained economically with a single hydraulic motor; therefore, a layout provided with two hydraulic motors 55 and 56, associated by means of gears 61, 62 and 63 with the sun gear 64, has been chosen; the larger-displacement motor of the two goes to zero. The maximum overall displacement is in fact equal to 107+80=187, whereas the minimum one is equal to 187/3.712=50.3, with r=80/50.3=1.59.

In order to contain the speed of the sun gear 45, which seems to be rather high, i.e. 7500 rpm, it is possible to use, as already stated, the same epicyclic train 40 in reduction, by connecting the outer ring gear 41 to the input shaft 44, the sun gear 45 to the hydraulic pumps 48 and 49 and the spider 43 to the output 65. Indeed due to these new configurations, the maximum speed, i.e. 27/38 kilometers per hour, is obtained when the epicyclic train rotates rigidly by means of a clutch 66 while the hydraulic pumps 48 and 49 run idle: when the sun gear 45 is locked by the associated brake 50, the second range, i.e. 19/27 kilometers per hour, is obtained while the pumps 48 and 49 are motionless, whereas during power distribution the sun gear 45 counter-rotates with respect to the input ring gear 41 and to the spider 43, and thus its reaction torque is added to the input torque.

The clutch 52 is keyed to the shaft 65 with its driving disks and selectively actuates the gear 67 or the gear 68 (respectively for the forward and reverse gears).

The gear 67 meshes with the gear 69, which is keyed on the shaft 59 which, by means of a clutch 70, can be connected to the spider 58 of the train 53 which can be rigidly coupled to a frame 71 by a clutch 72.

The hydraulic motor 55 is connected to the gear 62 by means of a shaft 73, and the hydraulic motor 56 is connected to the gear 63 by means of a shaft 74. A braking disk 75 is keyed on said shaft 74 and can be locked by a caliper 76 rigidly coupled to the frame 71.

The gear 68 meshes with the reversal gear 77, which meshes with the gear 78 keyed on the shaft 74.

In direct drive, the gear 78 meshes with the output gear 79.

This fact allows to reduce the maximum rpm rate of the sun gear to approximately 5300 rpm, whereas motion reversal poses no problems, since a hydrostatic connection is involved. The ratios between the two rpm rates of the individual shafts which constitute the gearbox are obviously different but can be easily obtained with gears provided with a different number of teeth.

It has been observed that the present invention achieves the intended aim and objects, constituting a power distributor unit capable of meeting heavy restrictions linked both to the applicable statutory provisions and to the problems related to power adjustment in various steps of the use of the agricultural or industrial machine.

The invention thus conceived is susceptible to numerous modifications and variations, all of which are within the scope of the inventive concept. All the details may furthermore be replaced with other technically equivalent elements.

In practice, the materials employed, as well as the dimensions, may be any according to the requirements.

I claim:

1. Power distributor unit particularly for agricultural, industrial and similar machines, comprising an input drive shaft, said drive shaft being connected to a spider for planetary gears of an epicyclic train including a sun gear and a ring gear, said sun gear being keyed to a transmission shaft, locking means being keyed to said transmission shaft for locking said sun gear with respect to said ring gear of said epicyclic train, transmission means being keyed to said transmission shaft for connecting said sun gear to a continuously-variable transmission, a first clutch for connecting said ring gear to a first countershaft, said first countershaft being connected to said continuously-variable transmission, said first clutch acting as a power-adder train, said ring gear being rigidly connected to an output gear of said power distributor unit.

2. Unit according to claim 1, wherein said ring gear, which meshes with said planetary gears, is arranged on an internal surface of a first hollow shaft supported, by means of ball bearings, by a frame of said structure, said first hollow shaft being provided with said output gear on an outer surface and being selectively connectable to said transmission shaft by means of a second clutch.

3. Unit according to claim 1, wherein said locking means comprise a brake which has a disk keyed on said transmission shaft and a brake caliper fixed to said frame.

4. Unit according to claim 1, wherein said continuously-variable transmission comprises a first gear keyed on said transmission shaft and meshing with a second gear keyed on a second countershaft supported by bearings connected to said fame, said second countershaft having a first pair of pulleys selectively engageable by a first clutch and engaging a trapezoidal metallic belt, said belt engaging a second pair of pulleys arranged on said first countershaft and being rigidly associable with said first countershaft by means of a second clutch.

5. Unit according to claim 2, wherein said first hollow shaft can be selectively connected to a second hollow shaft by means of said first clutch, said second hollow shaft having a third gear which is keyed thereon and meshes with a fourth gear which is keyed on said first countershaft.

6. Unit according to claim 2, wherein said first clutch and said second clutch are suitable to be selected in a mutually exclusive manner.

7. Unit according to claim 1, wherein said continuously-variable transmission comprises a pair of variable-displacement hydrostatic motors actuated by said sun gear by means of a kinematic train constituted by a pair of gears and by a connecting shaft connecting said pair of hydrostatic motors, said connecting shaft being lockable by means of a brake keyed thereon.

8. Unit according to claim 7, comprising a clutch for selecting a forward transmission branch and a reverse transmission branch.

9. Unit according to claim 7, wherein the range of the gearbox is equal to the square root of the ratio between the engine rate variation, multiplied by the pump rate variation, and the pump displacement variation.

* * * * *